United States Patent [19]
Schreiber et al.

[11] Patent Number: 4,838,473
[45] Date of Patent: Jun. 13, 1989

[54] MACHINE ARRANGEMENT CONSISTING OF A PLURALITY OF WORKING MACHINES

[75] Inventors: Peter Schreiber, Ipsach; Michel Richner, Hauterive, both of Switzerland

[73] Assignee: Fael S.A., Saint-Blaise, Switzerland

[21] Appl. No.: 134,807

[22] Filed: Dec. 18, 1987

[30] Foreign Application Priority Data

Dec. 18, 1986 [CH] Switzerland ................. 5101/86

[51] Int. Cl.⁴ ............................................. F16M 5/00
[52] U.S. Cl. ................................. 228/45; 248/657; 413/77
[58] Field of Search ............... 228/45, 47; 248/651, 248/656, 657, 678, 679; 413/77; 29/33 Q, 33 S

[56] References Cited

U.S. PATENT DOCUMENTS

| | | | |
|---|---|---|---|
| 1,575,492 | 3/1926 | Marsna | 248/657 |
| 2,722,392 | 11/1955 | Talbot | 248/678 |
| 2,934,384 | 4/1960 | Sloyan | 248/657 |

*Primary Examiner*—Kenneth J. Ramsey
*Attorney, Agent, or Firm*—Watson, Cole, Grindle & Watson

[57] ABSTRACT

Two similar machines are arranged on a preferably common floor frame can be individually laterally dislocated by suitable means from a normal operating position into a non-operative position. This arrangement allows an extremely compact arrangement of the machines for the normal operation and due to the simple lateral displacing a position of the machines is made possible which allows access to all parts of the machines. The other machine may, if desired, continue its operation without any interruption.

7 Claims, 2 Drawing Sheets

MACHINE ARRANGEMENT CONSISTING OF A PLURALITY OF WORKING MACHINES

BACKGROUND OF THE INVENTION

1. Field of the Invention

The present invention relates to an arrangement of machines having substantially identical constructions.

2. Prior Art

Current assembly plants are often designed with two adjacent, parallel assembly lines to achieve the largest possible saving on space, whereby practically identically designed machines for a large variety of machining operations are respectively pair-wise installed.

However, when the machines are very large a saving on space is subject to limitations, specifically due to the fact that such machines must be accessible from all sides to allow maintenance, repair and adjusting operations. For this reason it hitherto has been practically impossible to install the largest of such machines closely adjacent to each other because accomplishing maintenance, repair and adjusting operations would have caused a partly intrinsic disassembly work.

SUMMARY OF THE INVENTION

Hence, it is an object of the present invention to provide an arrangement or plant of machines which allows a reduction of the distances between two assembly lines to a true effective minimum without having to suffer the known disadvantages.

A further object of the present invention is to provide an arrangement of machines, in which two respective same machines are arranged on a floor frame and in which means are provided for dislocating each machine individually from a normal operating position where both machines are located adjacent each other along a longitudinal side, in a lateral direction into a non-operative position.

This principle may be advantageously applied in an assembly plant for sheet metal cans in which the two substantially identically designed machines consist of automatic welding machines for the welding of sheet metal cases, whereby the two machines are arranged on the floor frame in a substantially mirror-image arrangement based on the longitudinal center axis of the plant.

The tools which possibly must be exchanged as well as the adjusting devices are located preferably at both machines at the same side for the operator (i.e., these are not designed or located in a mirror image arrangement) such that the specialists which have received the corresponding instructions regarding the operations which are to be made can perform the operations they are used to make without any large rethinking.

The individual lateral dislocating or moving, resp. of the machines may be performed mechanically, e.g., by means of spindle, gear or chain drive or may be taken over by hydraulic or pneumatic operating cylinders.

For the lateral displacing of the machines laterally extending guides are provided at the preferably common floor frame.

Quite obviously, every machine can be uncoupled from the possibly operationally preceeding or following parts of the plant by a few manipulations only to thereafter be laterally displaced without any further ado.

According to a simple embodiment, the lateral distance of displacement of every machine is chosen such that the side facing the other machine is factually accessible to the operating or maintenance personnel if also the second machine has been dislocated in the opposite direction.

It is quite obviously better if the distance of the displacement of every machine is selected to be sufficiently large that the accessibility of the reverse side is also guaranteed even if the second machine remains in its operating position. With such embodiment it is quite obvious that during or after a dislocating of one of the machines, the other one can continue its operation without any interruption.

The control devices of the machines can be mounted on the machines proper or located adjacent the machines whereby in the latter case the control cables are led to the corresponding machines.

BRIEF DESCRIPTION OF THE DRAWINGS

The present invention will be better understood and other objects than those set forth above will become apparent if consideration is given to the following detailed description with reference to the appended drawings, and wherein.

DETAILED DESCRIPTION OF THE PREFERRED EMBODIMENT

The drawings illustrate the arrangement of two working machines arranged along the longitudinal axis A of an assembly line and on a floor frame, which machines of the illustrated embodiment consist, for instance, of two automatic welding machines.

The superstructures and individual components of the machines have no bearing on the present invention. Possible control means can be mounted on the machines proper or mounted at an adjacent location which is foreseen for these means.

Figure 1:
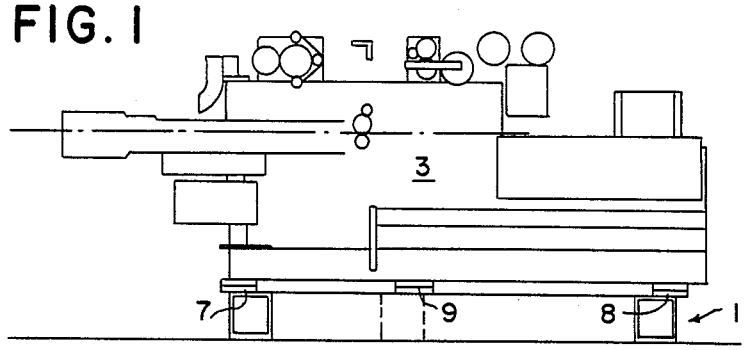
FIG. 1 is a side view of an arrangement of machines in accordance with the present invention.
Figure 2:
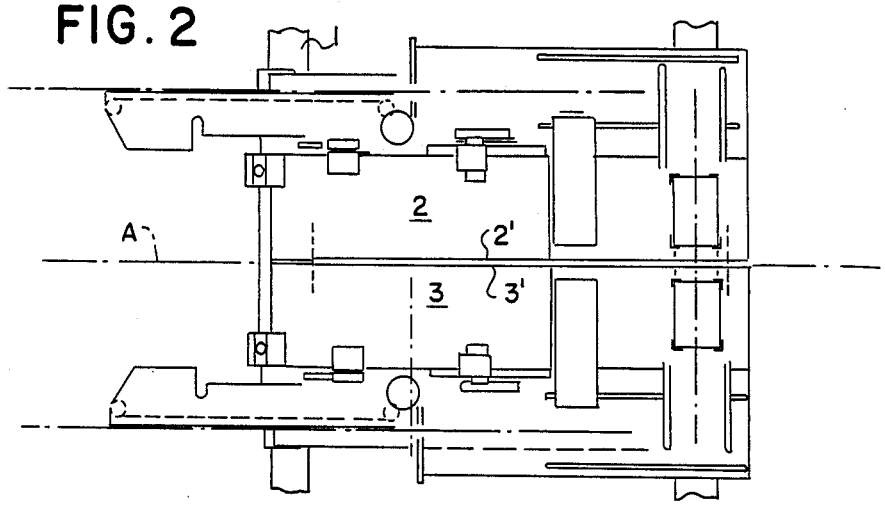
FIG. 2 is a top view of the machine arrangement of FIG. 1, specifically of two adjacently mounted automatic welding machines.
Figure 3:
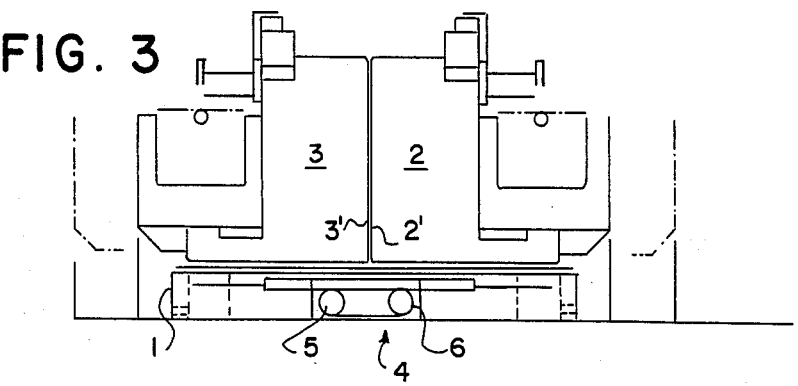
FIG. 3 is a front view of the arrangement of FIGS. 1 and 2.

The FIGS. 1 and 2 illustrate the two machines 2, 3 in a position in which two of their longitudinal sides 2', 3' are located closely adjacently, i.e., specifically saving on space. In this so called normal operating position both machines can operate and execute thereby the same or different working operations.

By means of a suitable drive mechanism 4, e.g., a spindle drive, each of the two machines 2 or 3, resp., can be dislocated by a respective motor 5, 6 laterally out of its normal operating location or position, resp., such that also the reverse sides (i.e., the sides practically abutting each other) of both machines are accessible.

Because both machines can be dislocated individually it is possible to keep the other machine also in such case in operation, in which the other is being dislocated laterally. The maximum distance attainable between the two machines can be quite obviously freely selected and necessitates mainly a corresponding design of the floor frame and of the drive.

Figure 4:
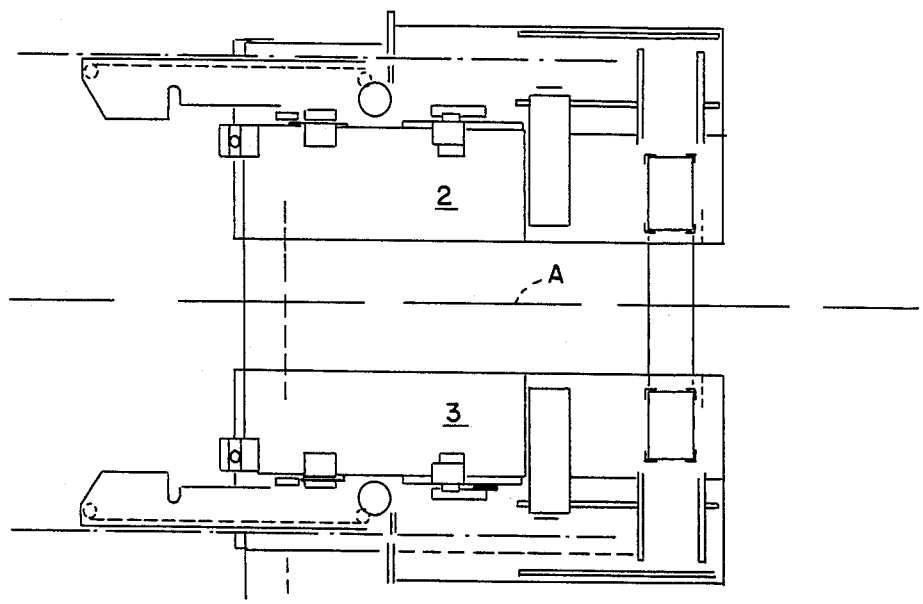
FIG. 4 is a view in accordance with FIG. 2 having machines which are dislocated laterally relative to the longitudinal axis of a production line.
Figure 5:
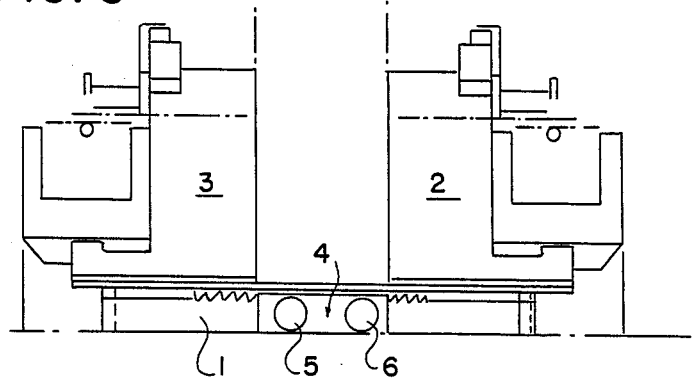
FIG. 5 is a front view of the arrangement of FIG. 4.

FIGS. 4 and 5 illustrate the arrangement of the machines if both machines are dislocated. As mentioned previously, it is also possible to dislocate one of the machines only to a given instance.

Although the two machines 2, 3 are arranged substantially in a mirror-like fashion on the floor frame 1 and can be dislocated laterally on lateral rails 7, 8, 9, the tools and other adjusting devices are preferably arranged in the same way on the machines regarding a viewer, such that the operating personnel can always work in the same way independently from having to execute adjustments on the one or the other machine.

While there is presently shown and described one preferred embodiment of the present invention it shall be distinctly understood that such is for illustrating purposes only and not for restricting the scope of the invention, which is solely defined by the following claims.

We claim:

1. An arrangement of machines consisting of a plurality of working machines having substantially the same structure, in which two respective similar machines are arranged on a floor frame and in which means are provided for laterally dislocating each machine individually from a normal operating position where both machines adjoin each other directly along one of their longitudinal sides, into a non-operative position.

2. The arrangement of claim 1, in which both machines are automatic welding machines for the production of sheet metal cans, and in which the two machines are arranged substantially in a mirror image on the floor frame.

3. The arrangement of claim 1, in which exchangeable tools as well as adjusting devices at both machines are located at the same location relative to an operator.

4. The arrangement of claim 1, comprising laterally extending guides located at the floor frame, whereby an individual dislocating of the machines may be performed.

5. The arrangement of claim 4, comprising spindle, gear wheel or chain drives for performing the lateral dislocating of the machines.

6. The arrangement of claim 4, comprising hydraulic or pneumatic operating cylinders for performing the lateral dislocating of the machines.

7. In an arrangement of individual machines wherein the machines are aligned on a floor frame in two parallel rows on opposite sides of a longitudinal axis, corresponding machines on opposite sides of the longitudinal axis being substantially identical, the improvement wherein rails are provided on said floor frame for supporting said machines, said rails being perpendicularly oriented relative to the longitudinal axis, and wherein means are provided for individually moving said machines along said rails from an operative position closely adjacent said longitudinal axis to a non-operative position spaced away from said longitudinal axis.

* * * * *